United States Patent

[11] 3,620,288

| [72] | Inventors | Robert B. Barrow<br>Chesire;<br>Jeffrey D. Hostetler, Middletown, both of Conn. |
|---|---|---|
| [21] | Appl. No. | 837,247 |
| [22] | Filed | June 27, 1969 |
| [45] | Patented | Nov. 16, 1971 |
| [73] | Assignee | United Aircraft Corporation<br>East Hartford, Conn. |

[54] DIRECTIONALLY SOLIDIFIED CASTINGS
8 Claims, 2 Drawing Figs.

[52] U.S. Cl. .................................................. 164/52,
164/123, 164/127, 164/157
[51] Int. Cl. ...................................................... B22d 27/02,
B22d 17/32, B22d 27/04
[50] Field of Search ......................................... 164/52, 60,
123, 125, 127, 157, 252, 338, 348; 75/10 C;
148/16

[56] References Cited
UNITED STATES PATENTS

| 3,352,351 | 11/1967 | Sickbert | 164/348 X |
| 3,186,043 | 6/1952 | Murtland, Jr. et al. | 164/52 X |
| 3,248,764 | 5/1966 | Chandley | 164/127 |
| 3,417,809 | 12/1968 | Sink | 164/127 |

FOREIGN PATENTS

| 226,807 | 8/1908 | Germany | 164/52 |
| 484,614 | 9/1953 | Italy | 164/338 |

Primary Examiner—R. Spencer Annear
Attorney—Charles A. Warren

ABSTRACT: Production of directionally solidified castings using a consumable arc melting technique with cooling from the base of the apparatus by periodically interrupting the arc.

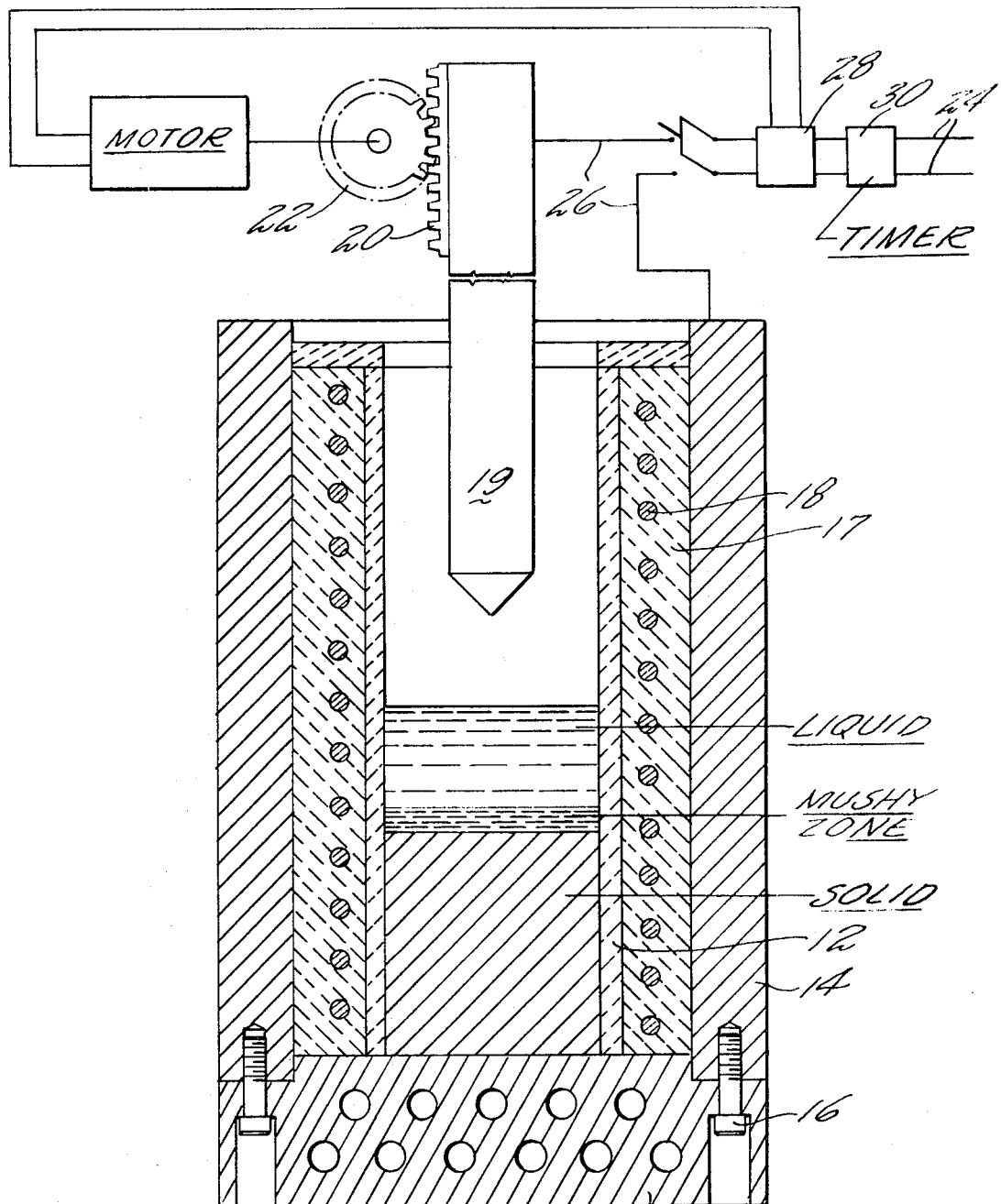
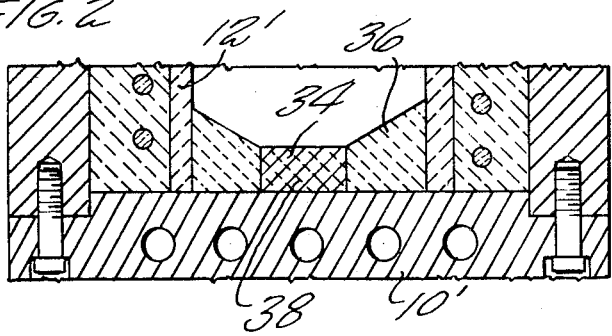
INVENTORS
ROBERT B. BARROW
JEFFREY D. HOSTETLER
BY Charles A. Warren
ATTORNEY

3,620,288

DIRECTIONALLY SOLIDIFIED CASTINGS

BACKGROUND OF THE INVENTION

Directionally solidified articles made of high-temperature alloys have been found to be particularly useful in gas turbines especially where the crystalline orientation may be controlled for example in relation to the load on the finished part. Such articles and a method of making them are described for example in the Ver Snyder U.S. Pat. No. 3,260,505. Articles having close dendrite spacing within the columnar grains are most desirable and it has been found that the fine-textured dendritic structure desired is obtainable by a relatively fast-cooling rate once the solidification has begun. It is desired to produce these directionally solidified articles as described in this patent.

SUMMARY OF THE INVENTION

One feature of this invention is the formation of directionally solidified articles by a consumable arc melting technique combined with a procedure for controlling the solidification rate thereby to produce a fine-grained dendritic structure. Another feature is process by which to obtain both the desired directionally solidified structure and also a desired orientation of the dendritic structure such, for example, as a <001> orientation along the longitudinal axis of the article.

According to the invention the apparatus includes a chill plate by which to start and continue the cooling of the melt at the desired rate to produce the desired fine-grained directionally oriented structure in the cast article. Extending upwardly from the chill plate is a mold or shell of ceramic material in which the article is cast, into which a consumable electrode of the material to form the casting is positioned with the free end projecting downwardly into the mold. Electrical energy supplied to the electrode forms an arc which melts the electrode to form a molten body which crystallizes upward from the chill plate to form the cast article. The arc is periodically interrupted during the casting process to control the rate of upward solidification from the chill plate and to improve the grain structure. In certain respects the invention is an improvement on the apparatus and method of the copending application of Barrow, et al., Ser. No. 803,539 filed Mar. 3, 1968 having the same assignee as this application.

BRIEF DESCRIPTION OF THE DRAWINGS

FIG. 1 is a sectional view of an apparatus for practicing the process of the invention.

FIG. 2 is a fragmentary sectional view of a modification.

DESCRIPTION OF THE PREFERRED EMBODIMENT

Referring to the drawing, the method may be carried out by the apparatus shown which includes a chill plate 10 or crucible bottom on which is positioned a mold 12 for the ingot in the form of a ceramic sleeve having its lower end resting on the chill plate 10. This ceramic sleeve is surrounded in spaced relation by a crucible sleeve or wall 14 solidly secured at its base to the chill plate as by bolts 16. This crucible sleeve may in turn be surrounded by a cooling jacket not shown although this is not a critical part of the device. The space between the mold 12 and the crucible wall 14 may be filled with an insulating granular ceramic material 17 to minimize heat loss from the molten alloy through the mold wall. A heating coil 18 may surround the mold 12 for heating the mold before the start of the casting operation.

A consumable bar or electrode 19 of the alloy to be cast is positioned within the sleeve 12 and is carried by any of the conventional electrode feeding devices by which an arc may be struck and maintained in the melting of the electrode within the sleeve. One type of well-known consumable arc melting furnace having this type of equipment feed is the Heraeus L200 H furnace. For the purpose of the present invention, it is sufficient to note that the bar 19 is mounted on a feed rack 20 that is moved by a gear 22 to advance the electrode into or out of the sleeve 12 at the appropriate rate to maintain the desired melting of the ingot. It will be understood that the arc is an electrical arc, the energy being supplied from a suitable source 24 with power leads 26, as shown, to the electrode and to the crucible. Obviously a suitable control 28 of conventional construction maintains the necessary power supply to the arc and also serves to control the electrode feed rate. Another control in the form of a timer 30 permits intermittent shutoff of the power supply to the motor and to the arc during the melting process. Such a timer is well known and need not be described in detail. The effect is to produce periodic spaced intervals of arc melting during the casting procedure.

The sleeve 12 and the surrounding insulation act as a heat barrier so that, as the electrode melts to form a pool within the sleeve, the major heat loss occurs axially through the chill plate at the base. The solidification front advances upwardly from the chill plate and the solidifying metal becomes columnar grained as described in the Ver Snyder Patent. Superheated molten metal is supplied to the mold just above the liquid-solid interface (the mushy zone) by the melting electrode and thus a very steep temperature gradient is maintained in the solidification zone. This produces a very fast solidification rate producing a fine dendritic structure. These dendrites have the preferential <001> orientation along the vertical axis of the cast article.

When the arc for melting the bar is originally struck between the electrode and the chill plate, and a molten pool is formed, the chill plate causes solidification to begin thereon. The sleeve 12 acts as a heat barrier, and the heat flow from the molten alloy into the chill plate is further enhanced by the preheating of the ceramic sleeve from the arc as melting progresses. It will be understood that the rate of melting of the electrode and thus of solidification of the alloy is a function of the power input and the effectiveness of the chill. The production of directionally solidified parts by the use of a chill and a steep thermal gradient in the mold is described and claimed in the Ver Snyder patent. During the casting process the arc is interrupted periodically to limit the depth of the molten zone and to permit further heat flow from the molten zone through the solid zone into the chill plate. With the arc off no heat is added to the molten alloy and solidification will occur at a rapid rate. When the arc is on the high heat energy supplied by the arc will quickly melt additional alloy to deepen the molten pool without materially delaying the solidification process. The interrupted arc technique permits more rapid solidification of the melt during the casting process thereby producing a finer dendrite spacing and a more satisfactory grain structure in the casting. It will be understood that other devices than the particular timer 30 may be used to provide the desired intermittent arc-on and arc-off conditions during the process.

For example in producing a directionally solidified ingot of 1½ inches in diameter, the chill plate was a copper plate with cooling passages therein and the cooling flow of water was set at 8 gal. per min. The electrical input for the arc was 220 amps at 21 volts and the electrode feed rate was substantially ½ inch per min., the electrode being 0.75 sq. in. in cross section. This ingot was cast from Mar M 200 alloy. It will be understood that this casting process is preferably done under vacuum.

After 210 seconds of arc "on" the pool of molten alloy was about 1½ inches deep and the arc was turned off for 60 seconds. Thereafter the arc was periodically on for 60 seconds and off for 150 seconds until the mold is filled to the desired level.

The resulting ingot was found to have the desired microstructure and a reduced microporosity. The high solidification rate obtainable by consumable arc melting produces closer dendritic arm spacing, a small eutectic phase and a finer distribution of smaller MC carbides all of which provide a better casting.

The effect of the periodic shutoff of the arc is to permit the maintenance of a high thermal gradient at the solid-liquid interface. As shown in FIG. 1, the solidification which began at the chill plate moves upwardly with the solid surface remaining substantially horizontal. As shown, there is a thin layer of part solid, part liquid metal, referred to as the mushy zone, above which is the molten pool of the alloy. During the "arc-off" period, the mushy zone moves upward at a rapid rate by reason of the loss of heat to the chill plate. During the "arc-on" period, the greatest heat is at the end of the electrode and melting occurs without materially increasing the heat at the mushy zone and thus only temporarily reducing the rate of upward movement of the mushy zone.

The growth of the columnar grains in this casting process occurs in the manner described in the Ver Snyder U.S. Pat. No. 3,260,505 or in the Sink U.S. Pat. No. 3,417,809. The dendritic growth within the individual columnar grains is at right angles to the chill plate and thus the growth is directionally solidified with both the columnar grains and the dendritic growth within the grains parallel to the longitudinal axis of the cast article.

This periodic melting of the electrode during the casting process is also applicable to the casting of single crystal ingots or articles and to this extent is an improvement over the above Barrow et al., application Ser. No. 803,539. The single crystal ingot is another form of directionally solidified material, with the direction of the dendrites controlled by a seed crystal. For example, as shown in FIG. 2, the apparatus is much the same as in FIG. 1 except that a seed crystal 34 is mounted on the chill plate 10' to promote the growth of the dendrites in a single crystal form during the casting process. To this extent the apparatus is similar to that described in the Barrow application Ser. No. 803,539 with a refractory 36 surrounding the seed crystal and the extending to the mold 12'. The single crystal ingot is produced as described above in connection with FIG. 1, with periodic interruption of the arc to permit a steeper thermal gradient within the solidifying alloy and to permit a faster solidification rate. Although the seed is normally cut from a single crystal such that the dendritic growth is at right angles to the chill plate, it will be understood that such a limitation is not necessary and if a dendritic growth is desired such that the <001> orientation is at an acute angle to the chill plate, the seed crystal is selected with the angular orientation desired as represented by the dotted lines 38 on the seed crystal.

Whether the orientation of the dendritic structure of the seed is at right angles to the chill plate or at an acute angle as shown, the periodic shutting off of the arc to produce intermittent melting of the electrode in maintaining the pool of molten alloy is effective in producing the desired microstructure in the alloy. The intermittent cutoff of the arc limits the depth of the molten zone of the alloy in the mold and permits a control of the thermal gradient in the alloy being cast in order to maintain the desired rate of solidification within the mold. In this way the rate of upward movement of the solid-liquid interface in the solidification process may be precisely controlled. As in FIG. 1, the rate of cooling may be further controlled by heating coil surrounding the mold if such appears desirable. This coil may be used in initially heating the mold to a temperature as high as or above the melting temperature of the alloy.

As an example of this technique as applied to directionally solidified articles of the single crystal type, an ingot of 1½ in diameter and 4 inches long was cast on a copper chill plate with coolant passages with the cooling water flow rate set at 8 gals. per min. The electrical output for the arc was 220 amps at <volts and the electrode feed rate during the "arc-on" intervals was substantially 1 inch per minute, the electrode being 0.75 sq. in. in cross section. The "arc-on" time was 35 seconds and the "arc-off" time was 150 seconds after an initial melting period that produced a depth of 1½ inches of molten alloy in the mold. This intermittent operation was continued to a final height of the molten pool surface of 4¾ inches above the chill plate. The ingot was cast from Mar M 200 alloy and the seed crystal was the same alloy. This casting procedure was carried out in a vacuum.

The cast ingot had the desired microstructure and a reduced microporosity. Being single crystal it was entirely free of grain boundaries and had a very close dendritic arm spacing, a small eutectic phase and a very fine distribution of small MC carbides.

We claim:

1. In the manufacture of a directionally solidified article, the steps of mounting a mold on a chill plate, positioning the end of a consumable electrode of the alloy material within the mold, striking an arc with said end of said electrode to cause melting of the electrode into the mold, limiting transverse heat transfer through the mold, continually cooling the chill plate to remove heat from the molten alloy so as to solidify the material from the chill plate upwardly as the alloy is melted, continuing to melt the alloy ahead of the liquid solid interface formed as the alloy is solidified by heat removal by the chill plate, and periodically shutting off the arc to control the depth of the molten alloy above the liquid-solid interface and thereby to maintain a high thermal gradient at the liquid-solid interface and to maintain a substantially horizontal interface.

2. Method of claim 1 including the step of preheating the mold before melting of the alloy begins.

3. Method of claim 1 in which the alloy is a high-temperature alloy.

4. Method of claim 1 in which the "on" intervals of the arc are less than about three times the length of the "off" intervals such that the cast article produced has parallel columnar grains extending substantially normal to the chill plate.

5. Method of claim 1 in which the "on" intervals of the arc are more than about four times the "off" intervals such that the cast article is a single crystal article.

6. In the casting of a directionally solidified article, in a mold resting on a chill plate, the steps of melting alloy into the mold by a consumable electrode, arc melting technique in which the end of the consumable electrode is positioned within the mold, continually cooling the molten alloy from the chill plate to solidify the alloy, and periodically interrupting the arc for selected intervals during the melting process thereby to control the cooling rate of the alloy being cast.

7. The method of claim 6 in which the "on" intervals of the arc are less than about three times the length of the "off" intervals such that the article cast has substantially parallel columnar grains substantially normal to the chill plate.

8. The method of claim 6 in which the "on" intervals of the arc are more than about four times the "off" intervals such that the article cast is a single crystal article.

* * * * *

PO-1050
(5/65)

UNITED STATES PATENT OFFICE
CERTIFICATE OF CORRECTION

Patent No. __3,620,288__　　　　Dated __November 16, 1971__

Inventor(s) __Robert B. Barrow and Jeffrey D. Hostetler__

It is certified that error appears in the above-identified patent and that said Letters Patent are hereby corrected as shown below:

Column 4, line 4　　Delete "$\leq$" and insert -- 21 --.

Signed and sealed this 23rd day of May 1972.

(SEAL)
Attest:

EDWARD M. FLETCHER, JR.　　　　ROBERT GOTTSCHALK
Attesting Officer　　　　　　　　Commissioner of Patents